United States Patent [19]

McClure et al.

[11] Patent Number: 5,471,472
[45] Date of Patent: Nov. 28, 1995

[54] NETWORK MULTIPLEXER

[75] Inventors: R. Bruce McClure, Harvard; Christopher P. Lawler, Wellesley; Shannon Q. Hill, Westford, all of Mass.

[73] Assignee: Synernetics Inc., North Billerica, Mass.

[21] Appl. No.: 738,200

[22] Filed: Jul. 30, 1991

[51] Int. Cl.[6] ..................................................... H04J 3/02
[52] U.S. Cl. ..................... 370/85.13; 370/85.14
[58] Field of Search ........................... 370/85.13, 85.14, 370/85.9, 85.6, 94.1, 94.3, 94.2, 85.12, 85.15

[56] References Cited

U.S. PATENT DOCUMENTS

| | | | |
|---|---|---|---|
| 4,521,998 | 6/1985 | DeLorme | 52/81 |
| 4,597,078 | 6/1986 | Kempf | 370/85.13 |
| 4,627,052 | 12/1986 | Hoare et al. | 370/85.13 |
| 4,663,748 | 5/1987 | Karbowiak et al. | 370/89 |
| 4,757,497 | 7/1988 | Beierle et al. | 370/85.12 |
| 4,775,864 | 10/1988 | Herman | 340/825.5 |
| 4,787,082 | 11/1988 | Delaney et al. | 370/85 |
| 4,825,435 | 4/1989 | Amundsen et al. | 370/97 |
| 4,896,319 | 1/1990 | Lidinsky et al. | 370/60 |
| 4,899,333 | 2/1990 | Roediger | 370/60 |
| 4,905,230 | 2/1990 | Madge et al. | 370/85.5 |
| 4,933,937 | 6/1990 | Konishi | 370/85.13 |
| 4,947,390 | 8/1990 | Sheehy | 370/85.13 |
| 4,956,836 | 9/1990 | Boatwright | 370/16.1 |
| 4,982,400 | 1/1991 | Ebersole | 370/85.15 |
| 5,027,350 | 6/1991 | Marshall | 370/85.13 |
| 5,031,174 | 7/1991 | Natsume | 370/85.14 |
| 5,060,228 | 10/1991 | Tsutsui et al. | 370/85.9 |
| 5,086,426 | 2/1992 | Tsukakoshi et al. | 370/94.1 |
| 5,130,981 | 7/1992 | Murphy | 370/85.6 |

*Primary Examiner*—Douglas W. Olms
*Assistant Examiner*—Chau T. Nguyen
*Attorney, Agent, or Firm*—Weingarten, Schurgin, Gagnebin & Hayes

[57] ABSTRACT

A network interface for connecting a first network utilizing a first medium access control protocol to a plurality of relatively slower networks utilizing a second medium access control protocol. The network interface includes memory in which a table of addresses of nodes on the plurality of second networks is maintained. The network interface passes data from a data packet received from the first network to one of the plurality of second networks only if the destination address of the data packet matches one of the node addresses within the table of node addresses. The network interface passes data from a data packet received from one of the plurality of second networks to the first network only if the destination address of the data packet does not match a node address in the table of node addresses. The network interface passes data from a data packet received from one of the plurality of second networks to another of plurality of second networks only if the destination address of the data packet matches a node address in the table of node addresses.

5 Claims, 11 Drawing Sheets

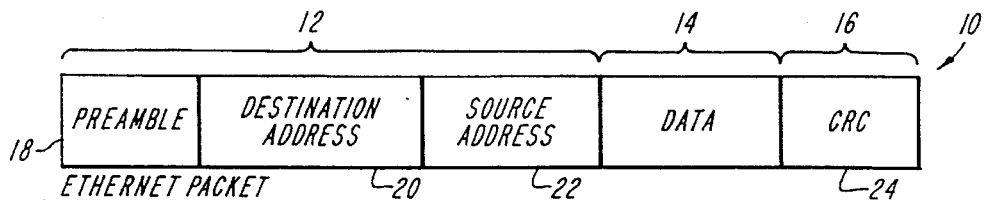
FIG. 1
(PRIOR ART)
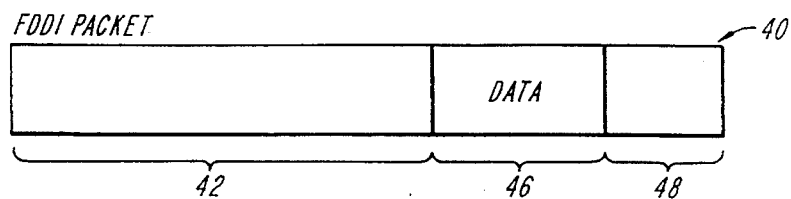
FIG. 1A
(PRIOR ART)
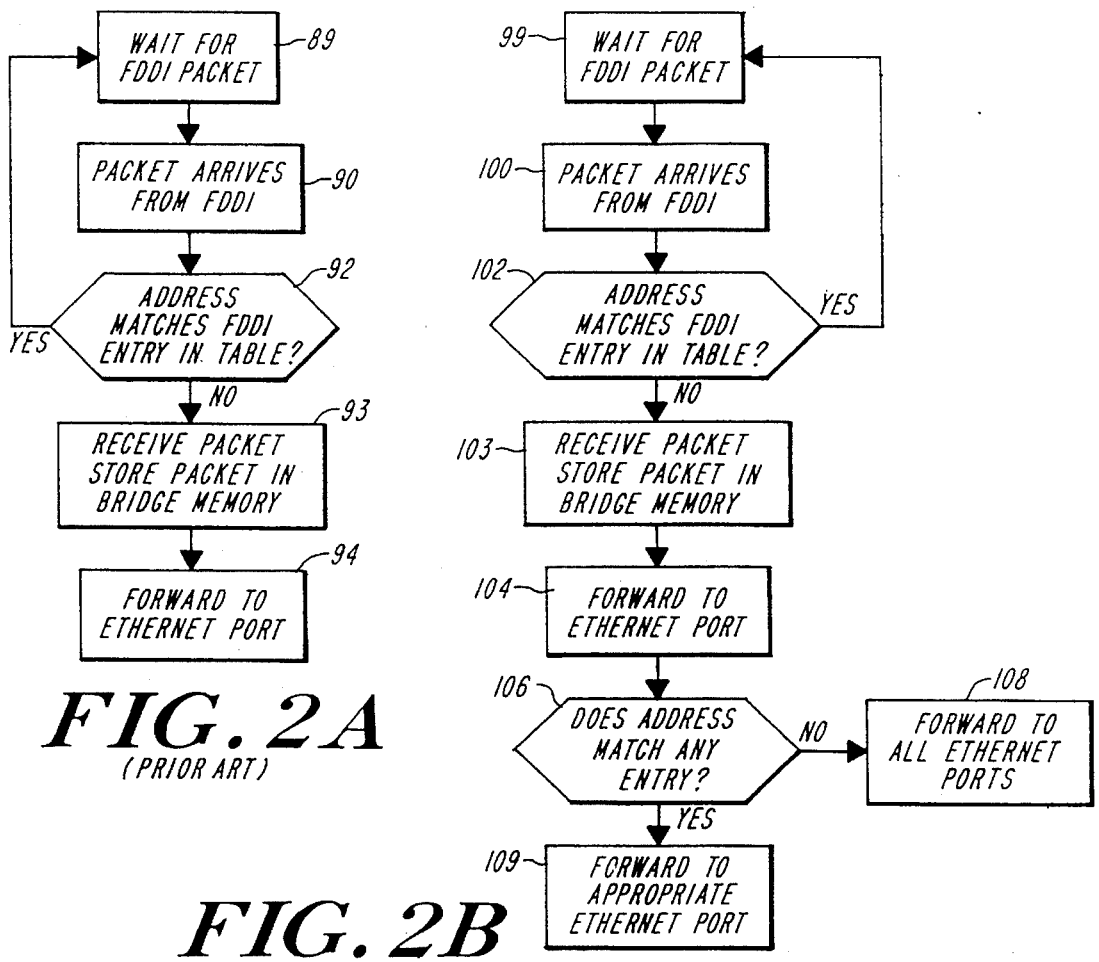
FIG. 2A
(PRIOR ART)
FIG. 2B

NETWORK MULTIPLEXER

FIELD OF THE INVENTION

The invention relates to the field of communications and more particularly to the field of computer network communications.

BACKGROUND OF THE INVENTION

Following the development of computers, it was realized that the ability to pass information between computers would enhance the functionality of the computers and the productivity of the users of such equipment. The interconnection of multiple computers, for example, permits programs on one computer to be executed by a user on another computer; permits data to be shared between users on different computers; and permits computationally intensive programs to be partitioned among several computers to increase the overall speed of the computation.

A group of interconnected computers, in which each computer is capable of communicating with the other interconnected computers, defines a network. Each computer device which is interfaced to the network is termed a network node. Data is exchanged between computers in an orderly and accurate manner by using a well defined set of rules and data structures termed a medium access control protocol. A medium access control protocol defines among other things the form that the data must have to be transferred across the network; how each node is addressed; and how each node will be given access to the communication channel.

Examples of two networks having differing medium access control protocols are the Ethernet carrier sense multiple access (CSMA) network and the optical Fiber Distributed Data Interface (FDDI). Both of these networks are packet data networks in which bytes of informational data to be transferred are encapsulated between bytes of network information data, such as source address, destination address and data word count. However, although both these networks transfer data in packets, the structure of the packets are different for both networks. Referring to FIGS. 1 and 1A, an Ethernet data packet 10 (FIG. 1) includes a header 12, data 14 and a trailer 16. The Ethernet header includes a preamble 18, which provides synchronization, the address of the node to which the data is destined 20, and the address from which the data originated 22. The Ethernet trailer 16 includes a cyclic redundancy check (CRC) word 24 to indicate whether the data has been corrupted in transmission. Although an FDDI data packet 40 (FIG. 1A) includes a header 42, data 44, and a trailer 46, the structure of the header 42 and the trailer 48 differs from that of the Ethernet packet 10.

Since different medium access control protocols are used by the various networks, networks using different medium access control protocols cannot directly communicate with one another without some form of translation equipment between the different networks. To permit computers, on two networks having different medium access control protocols, to communicate, a device, termed a bridge, is used. A bridge may also be used to connect networks using the same medium access control protocol in order to segment a network. An example of a bridge for permitting communication between networks having disparate medium access control protocols is shown in FIG. 2. A bridge 60 both interconnects two or more networks 62,64 and performs necessary medium access control protocol conversions on the data packets passing between the networks 62,64.

Because a bridge 60 interconnects at least two networks 62,64, a bridge 60 should properly pass data between the networks 62,64 only when a node, the destination node, (for example an FDDI node 70) destined to receive data is on another network (for example FDDI network 62) from the node, for example Ethernet node 72, (the source node) sending the data. If the source node 72 and destination node 76 are on the same network, for example Ethernet 64), the bridge 60 should not pass the data to the other network 62, since to do so increases unnecessarily the amount of data traffic on each network.

In the example shown in FIG. 2, an FDDI data packet network 62 interconnecting a series of computer nodes 70,74 communicates with a series of computer nodes 72,76 on an Ethernet data packet network 64 through a bridge 60. In such data packet networks, the bridge 60 determines whether the destination address located in the packet header indicates that the packet should be transferred between the two networks 62,64 and if so provides the medium access control protocol conversion necessary for the Ethernet 64 and the FDDI network 62 to communicate.

Typically, the bridge 60 maintains a network table containing a list of known nodes 70,72,74,76 and the corresponding network 62,64 to which the nodes 70,72,74,76 belong. When a data packet arrives at the bridge 60 from one network, for example the Ethernet 64, the bridge 60 compares the destination address 20 in the header 12 of the data packet 10 with the addresses in the network table. If the destination address 20 corresponds to the other network 62 to which the bridge 60 is attached and not the network 64 which originated the data message, the bridge 60 performs medium access control protocol conversion and passes the data across the bridge 60 to the other network 62.

If the data packet 10 contains a destination address 20 in its header 12 which is unknown to the bridge 60, that is, an address not listed in the network table, the bridge 60 generally provides for transmission of the data packet on to both of the connected networks 62,64 to assure that the packet will arrive at the desired network. In this case, with reference to FIG. 2, when node 70 receives data and replies, for example, with an acknowledgement, the bridge 60 is able to determine the network 62,64 to which the node 70 belongs. The bridge 60, then enters the node 70 in its network table along with the appropriate network identifying information. Until most of the nodes 70,72,74,76 on each of the networks 62,64 to which the bridge 60 is attached are included in the network table, each network 62,64 is flooded with data packets which are not actually destined for it. FIGS. 2A and 2B depict exemplary flow diagrams used in conventional network bridges to determine how data packets are to be passed to a network on opposite sides of the bridge. FIG. 2A depicts the flow diagram used for a bridge that interconnects two networks. FIG. 2B depicts the flow diagram used in a bridge which connects more than two networks, that is, a multiport bridge. Referring to FIG. 2A, once a packet arrives at the bridge on the FDDI network 62 as illustrated in block 90, the bridge 60 determines 92 if the destination address matches any FDDI side entry in a network table. A network table is a list of all node addresses known by the bridge on a per network basis. If there is a match, the packet is destined for a node 70,74 on the FDDI network 62 side and the bridge 60 does not receive it. A packet is received by copying the packet into bridge memory. If the destination address of the packet does not match any FDDI side entry in the table, the bridge 60 receives the packet and forwards it to the Ethernet network 64. Therefore, if the packet were destined for a node 70,74 on the FDDI network 62 and the bridge 60 did not have the node listed in its network table, the packet would still be forwarded to the Ethernet network 64.

Referring to FIG. 2B, alternatively, upon the arrival of a FDDI packet 100, the destination address is examined 102 to determine if the address corresponds to any FDDI side entry in the table. If there is a match, the packet is destined for a node 70,74 on the FDDI network 62 side and the bridge 60 does not receive it. If the destination address of the packet does not match any FDDI side entry in the table, the bridge 60 receives the packet. A determination is then made 106 to see if the destination address corresponds to any entry in the table. If the destination address does not correspond to a known node, the packet is forwarded 108 to all Ethernet ports. If a match is found, the bridge 60 forwards the packet to the Ethernet network corresponding to the matched entry. As a default case, if a destination node is unknown, the packet is forwarded. In the case of packets going from the Ethernet networks to the FDDI network, the bridge operates in the same manner as described above. That is, a bridge operates in a symmetrical manner.

A bridge typically ages entries out of its address tables if those addresses have been inactive for a predetermined amount of time. Generally this amount of time is on the order of several minutes. This permits space for new entries in the table.

It should be noted also that in the typical two port bridge 60, the multiple nodes 72,76 on one network, for example the Ethernet 64, each share the bandwidth of that network 64 connected to the bridge 60. This results in each node 72,76 being allocated significantly less than the total network bandwidth available. This results in decreased efficiency when the receiving network has a greater bandwidth than the transmitting network.

The present invention not only decreases the amount of network flooding, but also acts as a multiplexer which permits multiple networks such as Ethernet to be connected to a primary network or backbone network such as the FDDI.

SUMMARY OF THE INVENTION

The invention relates to a network interconnect device for permitting a plurality of networks to communicate with each other. It may be desirable, in accordance with the invention, to connect a plurality of networks to a higher speed backbone network so as to afford a higher bandwidth to the nodes connected to the lower speed networks. The connected networks are tightly coupled via the network interconnect device to provide performance benefits including the minimization of latency with regard to internetwork communications.

In one embodiment, the presently disclosed system includes a backplane having a VME bus, a scan path, in the form of a JTAG bus (IEEE Std 1149.1) and three Backplane FDDI Rings. A Processor module is in communication with each of the backplane buses, as is an FDDI Trunk Ring Attach (TRA) module and one or more FDDI Port modules and Ethernet Interface (EI) modules.

The EI module is capable of learning which Ethernet nodes are attached to it and maintains a table of those nodes in memory. The operation of the EI module is unlike the operation of a conventional bridge in that it stores only the address of nodes connected to the Ethernet networks on the EI module. Addresses on the FDDI side of the EI module are not stored in the EI module and thus are not known to the EI module.

Data received from the FDDI is transmitted to a given Ethernet attached to an EI module only if the address of the node for which the data is destined matches an entry in the table of nodes stored in the EI module memory. Likewise, data received from the Ethernet networks attached to each EI module is multiplexed and transmitted to one of the Backplane FDDI rings only if the data is not destined for one of the Ethernet networks attached to the EI module.

The EI module deletes entries out of its address table in a manner different than a conventional bridge. When node entries in excess of the table capacity are to be added, the EI module deletes the least recently used node entries.

BRIEF DESCRIPTION OF THE DRAWING

These and other features and advantages of the invention will be more readily understood in view of the accompanying specification and drawings in which:

FIG. 1 is a diagram showing a prior art Ethernet packet format; FIG. 1A is a diagram showing a prior art an FDDI packet format;

FIG. 2A is a flow diagram showing the operation of the bridge depicted in FIG. 2;

FIG. 2B is a flow diagram illustrating the operation of a multiport bridge;

DESCRIPTION OF THE PREFERRED EMBODIMENT

In brief overview, to improve the performance of an Ethernet network in accordance with the present invention, an improved network interconnect is disclosed which increases the bandwidth available to and decreases the latency of the attached network nodes, without modifying the node interface. These benefits in part are provided by an asymmetrical address filtering mechanism. That is, a filtering mechanism in which the filtering of packets arriving at the EI module from a first network, such as an FDDI network, is not accomplished in the same manner as with respect to packets arriving at the EI module from one of a plurality of second networks, such as Ethernet networks.

Figure 2:
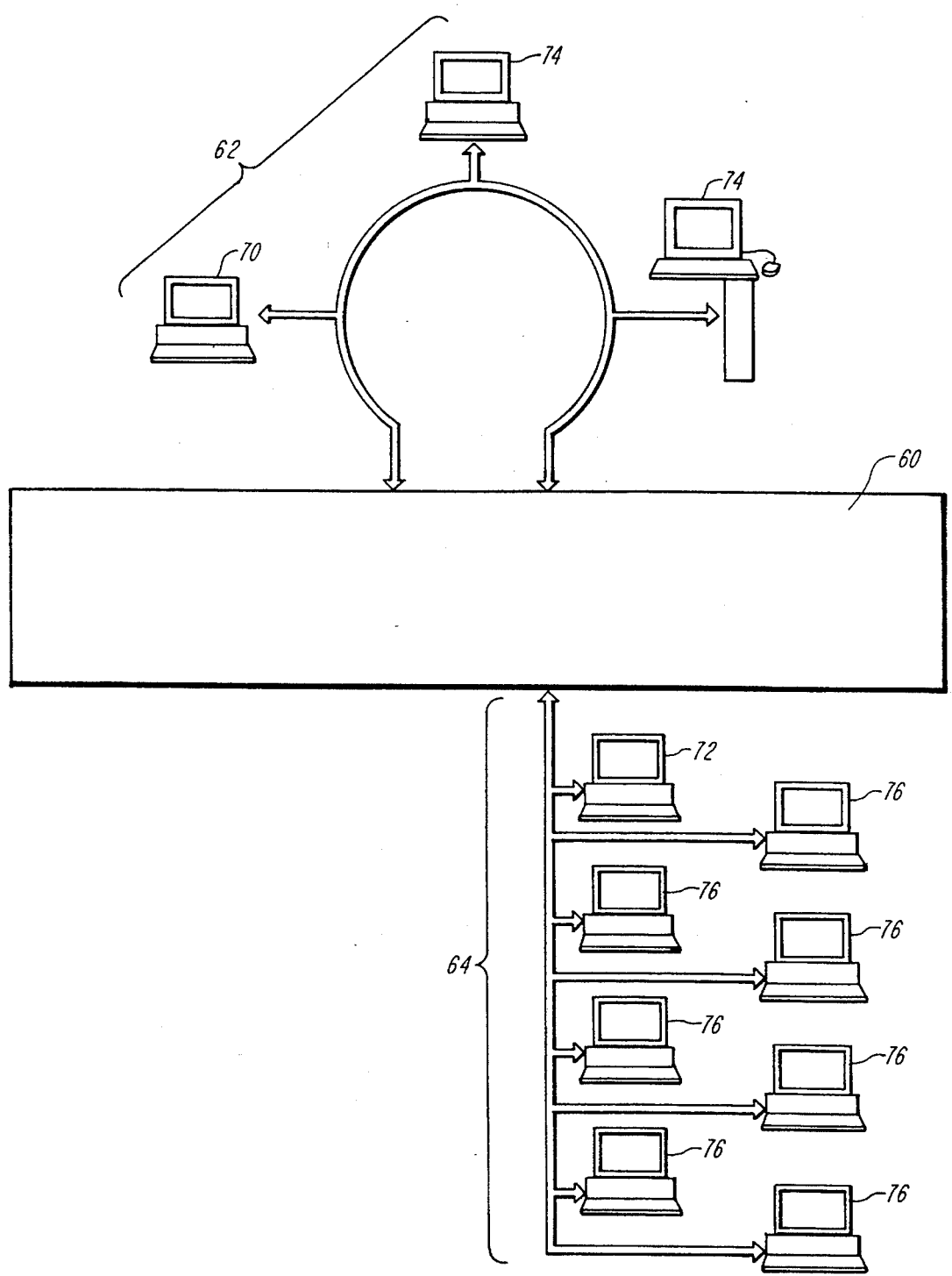
FIG. 2 is a diagram showing a prior art Ethernet to FDDI bridge.
Figure 3:
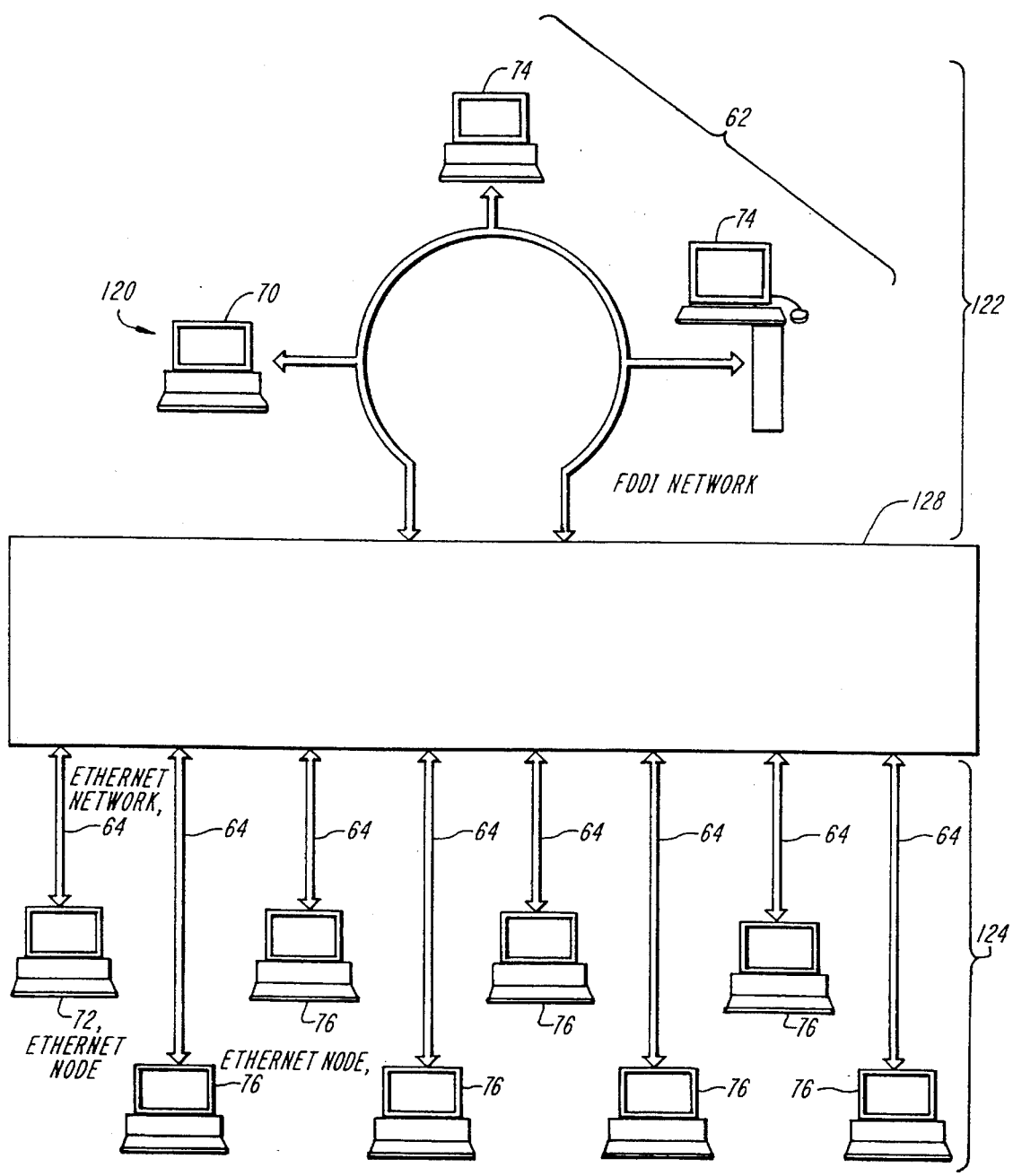
FIG. 3 is a block diagram of a computer communication system constructed in accordance with the invention.

To accomplish this, the EI module passes only those packets originating from the FDDI network and having a destination address corresponding to an Ethernet address which the EI module knows belongs to an Ethernet device attached to the EI module. This is distinct from a bridge in that the EI module does not store addresses of nodes that are on the FDDI side of the EI module. The EI module passes all packets originating from the Ethernet devices and destined for the FDDI network (ie. those packets not having an Ethernet address found in the EI module). The EI module converts the medium access control protocol of those data packets which are to pass between the FDDI and Ethernet networks. To perform these functions the system 128 has been constructed as described herein. Structure:

Referring to FIG. 3, a computer communication system 120 constructed in accordance with this invention includes a first portion 122 having a series of computer nodes 70,74 connected in an FDDI network 62. A second portion 124 of the system 120 includes a series of computer nodes 72,76 connected to one of a series of Ethernet networks 64. In the embodiment shown, each Ethernet network 64 may have multiple Ethernet nodes 76, as long as the total number of Ethernet nodes 76 summed over a single EI module 154 does not exceed 256. Although the FDDI network 62 in the embodiment shown is depicted communicating with a plurality of Ethernet networks 64, the second portion 124 of the system 120 may include token ring networks, star-wired configuration networks, or other networks known to those skilled in the art.

Figure 4:
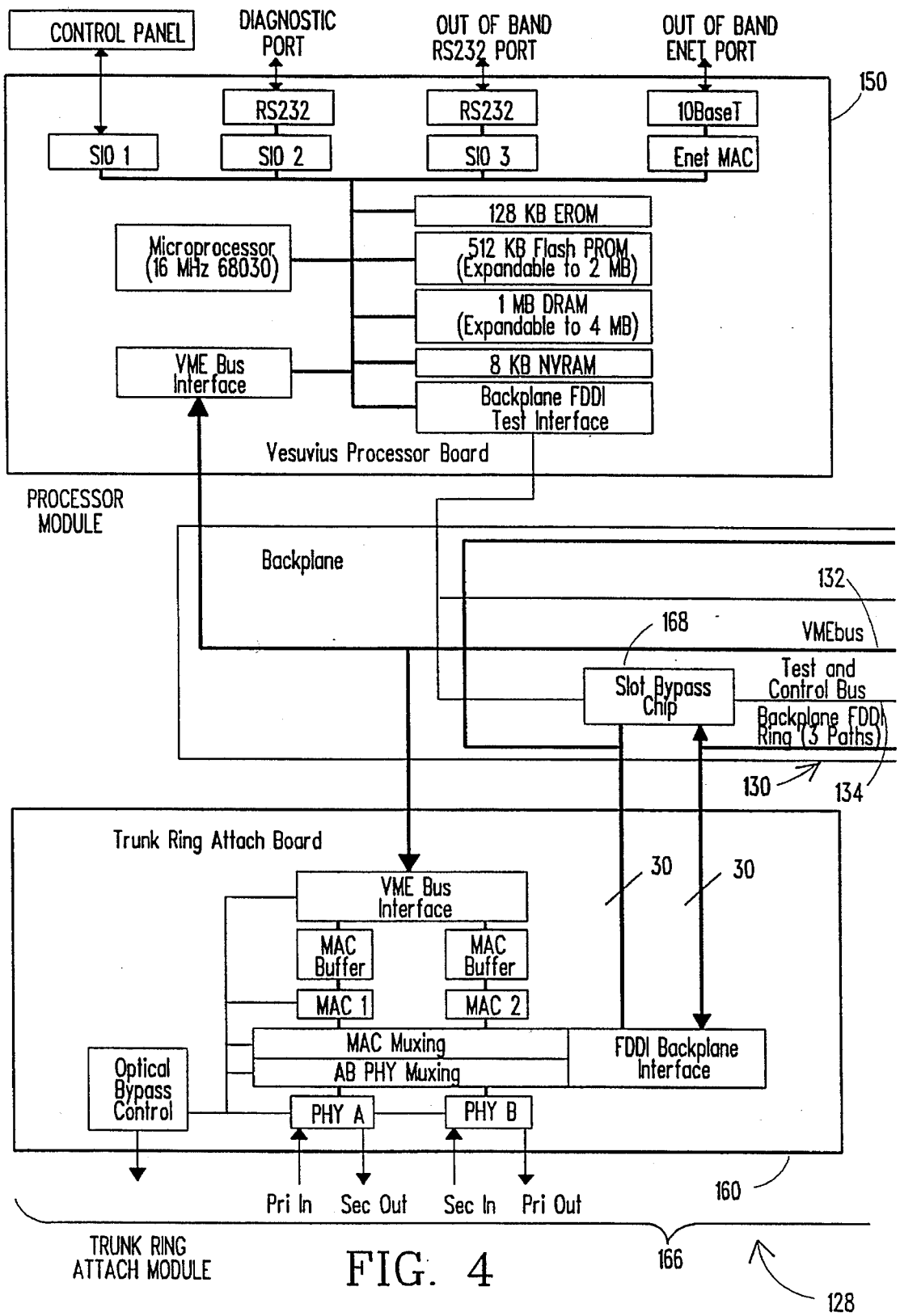
FIGS. 4A and 4B are a block diagram of an embodiment of the invention.
Figure 4A:
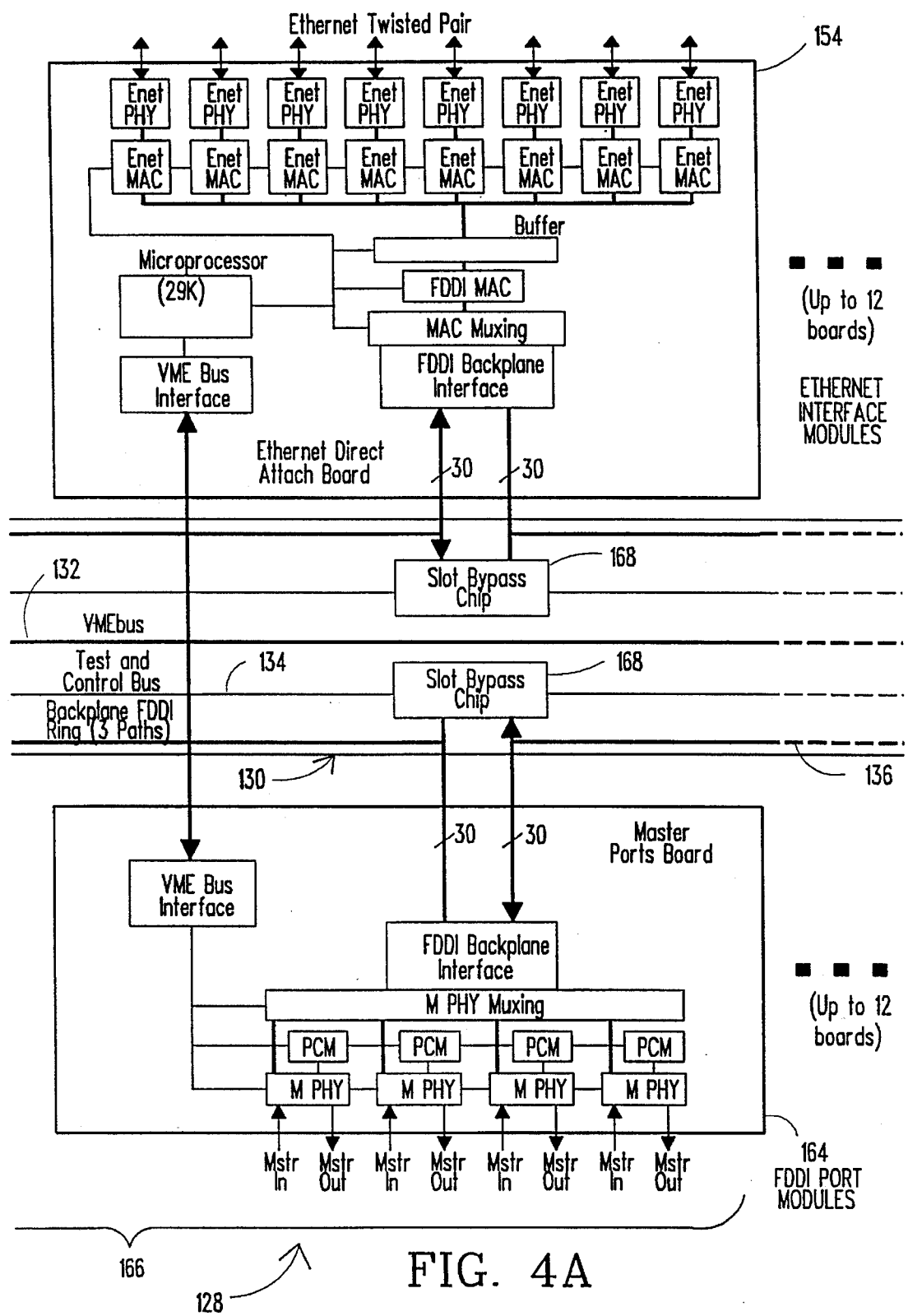
Figure 4B:
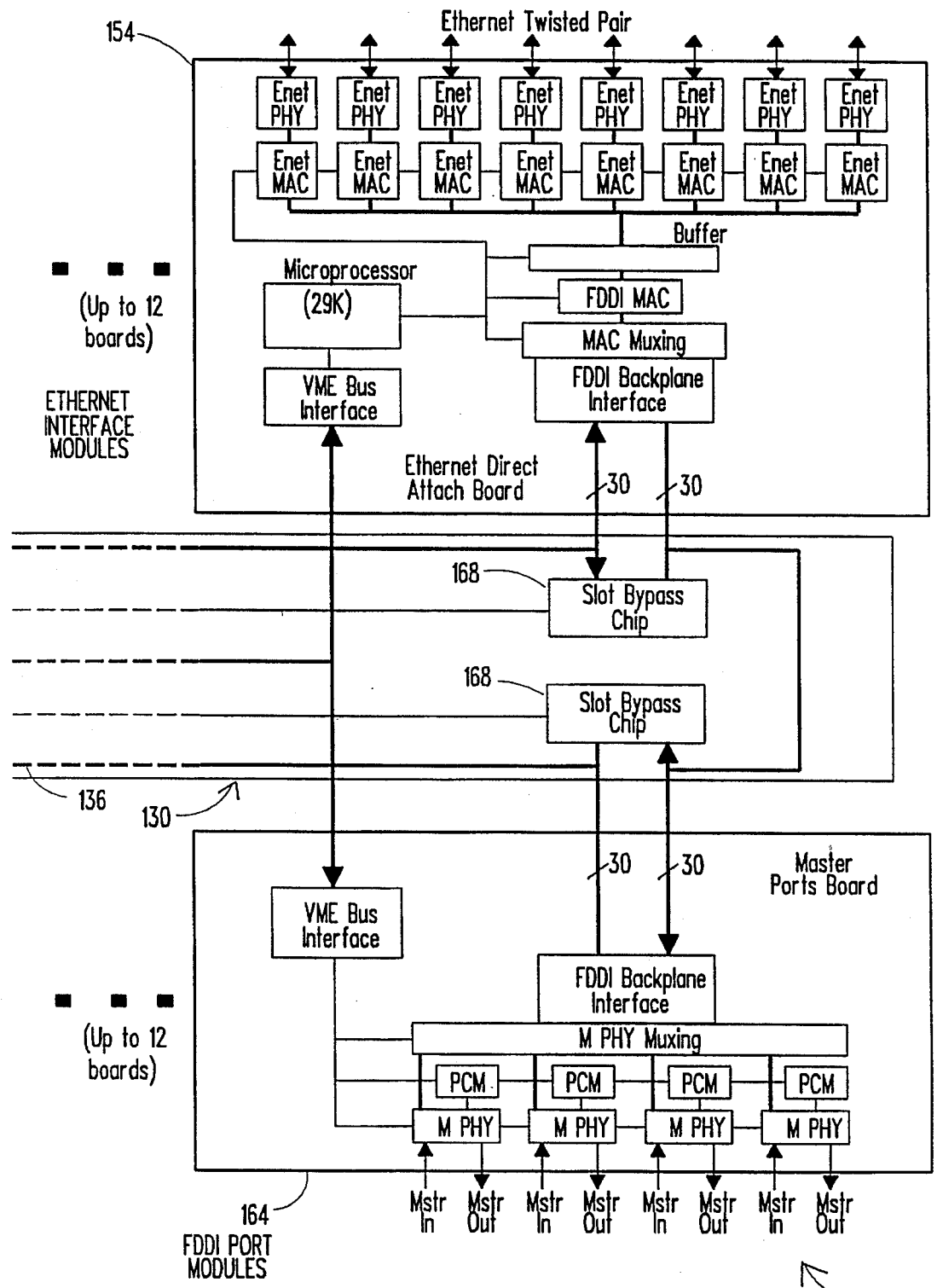

Referring also to FIGS. 4A and 4B, in more detail, the system 128 includes a backplane 130 which includes a VME bus 132, a JTAG bus 134 and three internal backplane FDDI rings 136. Each of the Backplane FDDI rings 136 has a byte wide data path with three additional bits. Two of these bits are used for control and the third is used for parity. Two of the FDDI rings 136 are typically used as in standard counter rotation FDDI communication. The third FDDI ring may be used for other FDDI communication. The internal backplane FDDI rings 136 transfer parallel electrical signals rather than the serial signals which are passed in the FDDI network rings 62, but except for this difference, and the fact that in the embodiment shown, the data is clocked across the backplane at 12.5 MHz, the internal backplane FDDI rings 136 operates in the manner and with the same medium access control protocol as the FDDI network rings 62.

In the embodiment shown, the backplane has slots for twelve modules. One module attached to the backplane 130 is a Processor module 150. An optional FDDI Trunk Ring Attach module (TRA) 160 may also be attached to the backplane. Depending on whether or not the TRA module is attached, there are either ten or eleven open slots in the backplane. These slots may be occupied by a series of up to ten or eleven Ethernet Interface (EI) modules 154, a series of up to ten or eleven FDDI Port modules 164, or any combination of these modules.

The combination of the TRA module 160 and an FDDI Port module 164 defines an FDDI Concentrator 166 which permits data from multiple FDDI devices to be concentrated and transmitted across the FDDI network by way of the TRA module 160 or be transmitted across the Ethernet networks by way of the EI modules 154. A series of Slot Bypass Chips 168 permit the various backplane modules to be electrically isolated from the backplane 130, without disturbing the continuity of the backplane FDDI 136 and VME 132 buses of the backplane 130.

Figure 5:
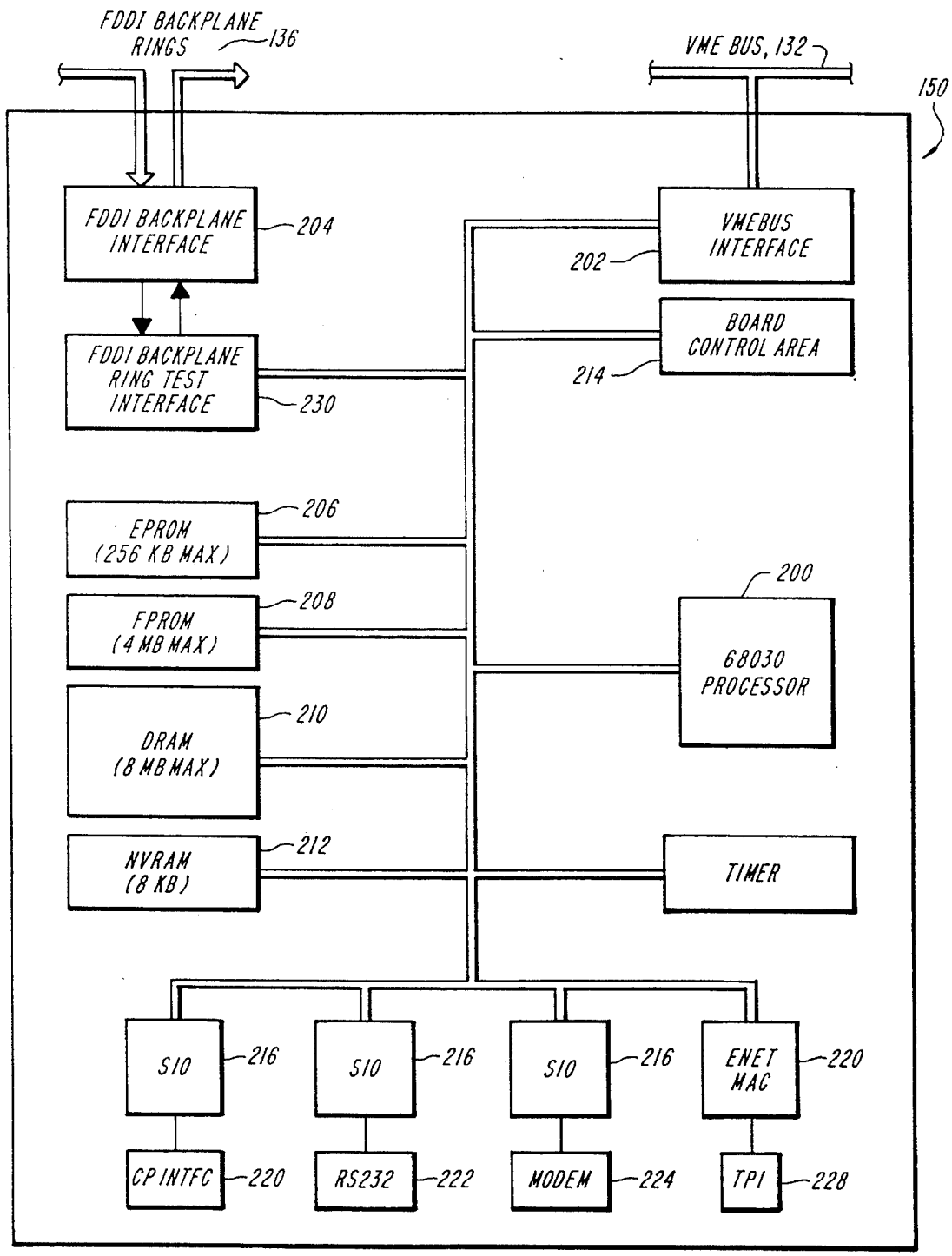
FIG. 5 is a block diagram of the Processor module shown in FIG. 4.

Considering the components of the system 128 in detail, and referring also to FIG. 5, the Processor module 150, which is responsible for system configuration, management and control, includes, in one embodiment, a 68030 microprocessor 200, which communicates with the VME bus 132 of the system backplane 130 by means of a VME interface 202 and with the backplane FDDI 136 of the system backplane 130 by means of a Backplane FDDI Interface 204. A backplane FDDI ring test interface 230 is used to test the backplane FDDI rings.

The 68030 microprocessor 200 boots from instructions stored in 256 KB of Erasable Prom (EPROM) memory 206 which in addition contains diagnostic programs for testing the 68030 microprocessor 200. The boot process copies a system program stored in up to 4 MB of Flash PROM (FPROM) memory 208 into up to 8 MB of Dynamic RAM (DRAM) memory 210. The system program is then executed by the 68030 microprocessor 200 from the DRAM 210. Once booted, system configuration information required by the 68030 microprocessor 200 is retrievable from up to 8 KB of non-volatile RAM (NVRAM) memory 212. Special module information, such as module revision information and module type, is stored in a series of registers in a Processor Module Control Area 214, which is also readable by the 68030 microprocessor 200.

Operator communication with the Processor module 150 may take place through any one of a series of serial I/O ports 216. A console panel 220, an RS232 interface 222, and a modem 224, each connected to a respective one of the serial I/O ports 216, may be used as the input device for the microprocessor 200. The Processor module 150 may also be accessed by way of an out-of-band Ethernet connection, that is, an Ethernet not using the EI module 154. Out-of-band Ethernet is connected to the Processor module 150 through an Ethernet Media Access Control (ENET MAC) 226 and 10Base-T twisted pair Ethernet Interface (TPI) 228.

Figure 6:
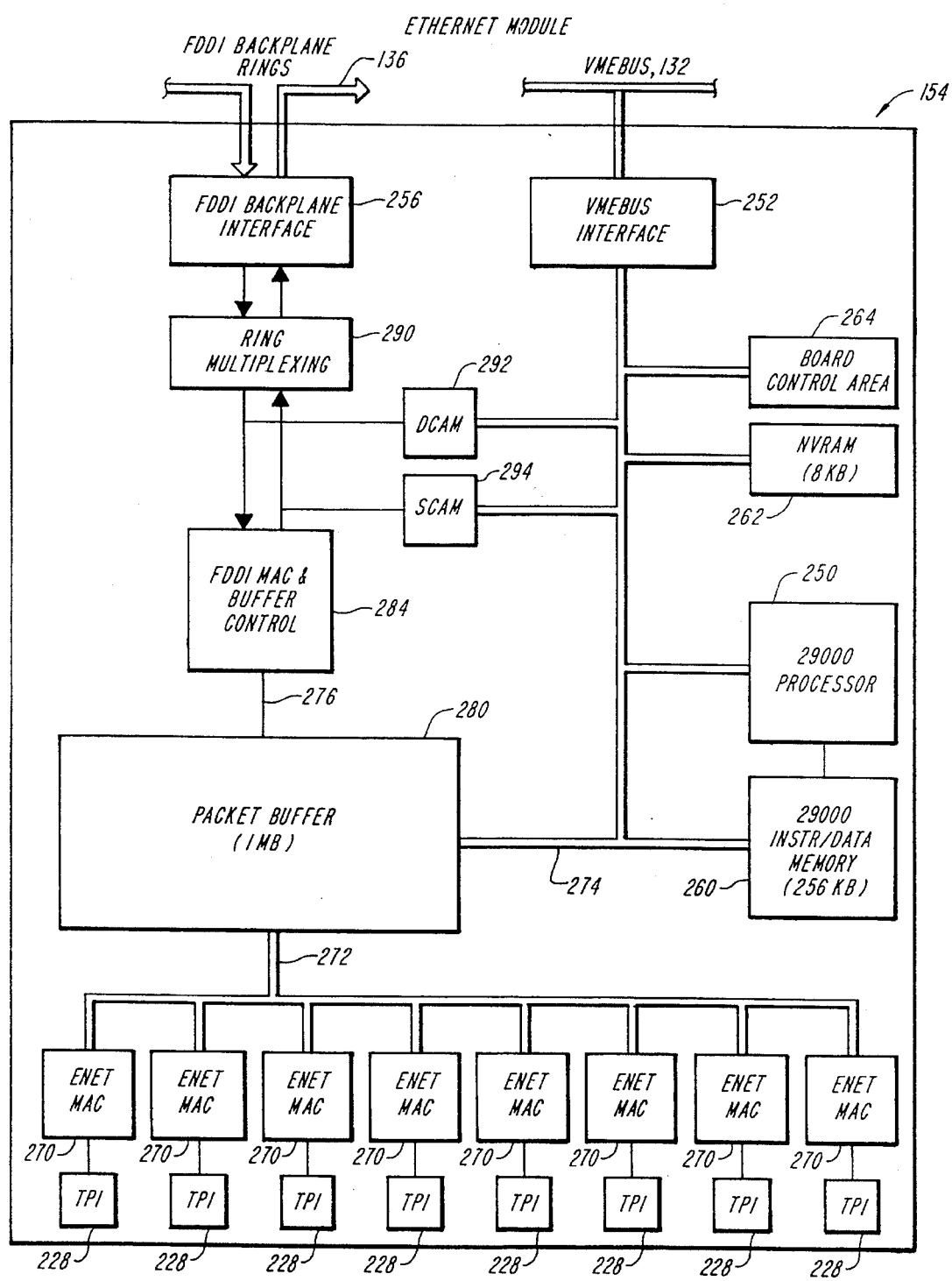
FIG. 6 is a block diagram of the Ethernet Interface module shown in FIG. 4.

Referring also to FIG. 6, the Ethernet Interface (EI) module 154 is an intelligent device which includes, in the embodiment shown, an AMD 29000 microprocessor 250. The 29000 microprocessor 250 communicates with the VME bus 132 by means of a VME interface 252 and with the backplane FDDI 136 by means of a backplane FDDI Interface 256. The program for execution by the 29000 microprocessor 250 is loaded from the Processor module 150 over the VME bus 132 into 256 KB of Data and Instruction RAM Memory 260. Configuration information, required by the 29000 microprocessor 250 is stored in up to 8 KB of non-volatile RAM memory 262. Other special module information, such as module revision information and module type, is stored in registers located in an EI Module Control Area 212.

Data from each of the Ethernet networks 64 in communication with the EI module 154 enter the EI module 154 through a respective one of eight 10Base-T twisted pair or any other suitable interface devices 228 and pass to a corresponding Ethernet Media Access Control port (ENET MAC) 270. The presence of eight Ethernet interface devices 228 on each EI module 154, in the embodiment shown, results in a total of eighty-eight Ethernet networks capable of being attached to each system 128. One possible configuration is to have one Ethernet node on each Ethernet network. This arrangement permits each of these individual Ethernet nodes to have available to it the full 10Mbit bandwidth of the Ethernet network. More than one node can be attached to each Ethernet network in which case the bandwidth of the respective network will be shared by the attached nodes.

Each ENET MAC port 270 includes a 32 byte FIFO for buffering the incoming data prior to transmitting it by way of a thirty two bit wide bus 272 to up to 1 MB of video DRAM used as a Packet Buffer 280. The video DRAM Packet Buffer 280 is a dual ported memory with the thirty two bit wide bus 272 and a thirty two bit wide bus 274 sharing one port and a serial data path 276 in communication with the second port. The serial data path 276 permits communication between the Packet Buffer 280 and a FDDI MAC and Buffer Controller 284. Since one FDDI MAC 284 controls the multiplexing of eight ENET MAC ports 270, all eight Ethernets attached to the EI module 154 are restricted to using the same backplane FDDI ring 136 since the FDDI MAC 284 accesses only one backplane FDDI ring 136 at a time. Data to and from the backplane FDDI Ring 136 leaves and enters, respectively, the dual ported Packet Buffer 280 by way of the serial data path 276 under the control of the Buffer Controller 284. The appropriate FDDI ring 136 is selected by a ring multiplexer 290 prior to data being placed on the ring 136 by the backplane FDDI interface 256.

The destination address from the incoming FDDI data packet 40 from the FDDI interface 256 is compared with the contents of a 256 location hardware Destination Content Addressable Memory (DCAM) 292. The DCAM 292 maintains an index relating each address in the DCAM 292 with the ENET MAC 270 to which the node having the address is connected. If a match between the destination address and an entry in the DCAM 292 is found, the data is passed, using the DCAM index to the Packet Buffer 280 and out through the Ethernet MAC 270 to which the destination node is attached. If no match is found, the data is disregarded. Since FDDI packets may arrive at rates approaching 500K packets per second, based upon the present state of technology, the determination of which packets are switched to which network, which is termed filtering, takes place in hardware.

A Source Content Addressable Memory (SCAM) 294 is used to remove a data packet from the FDDI ring 136 which has, as the source address, the address of a node which is connected to the EI module 154. This permits an FDDI packet 40 which has been transmitted by the EI module 154 and is circulating on the FDDI ring to be removed from the ring when the FDDI packet 40 is received by the EI module 154.

Figure 7:
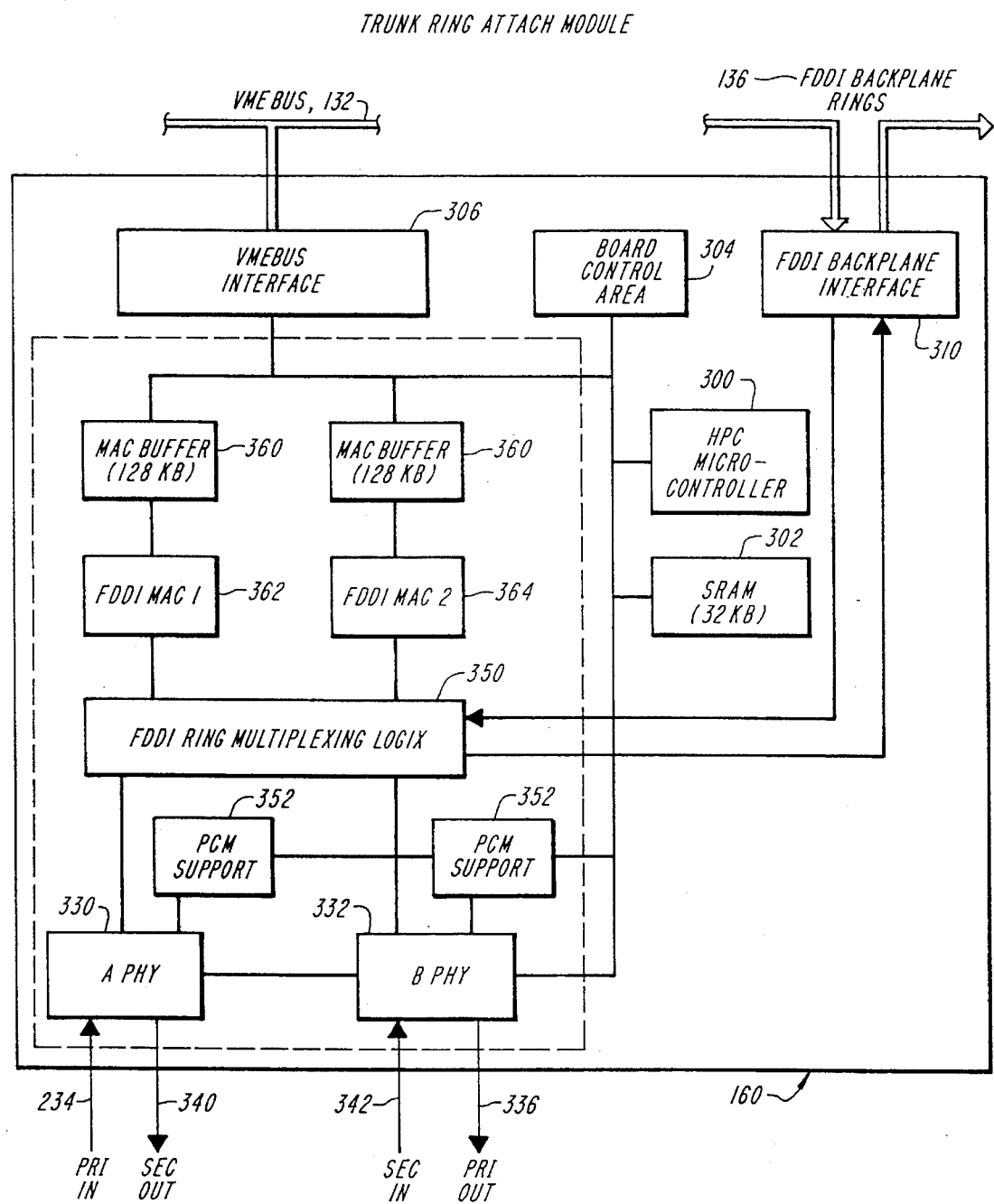
FIG. 7 is a block diagram of the FDDI Trunk Ring Attach module shown in FIG. 4.

Referring now to FIG. 7, the TRA module 160 includes a microprocessor 300, 32 KB of static RAM 302 for storing instructions and data, and a TRA Module Control Area 304 which includes registers for storing module specific information, such as module revision information and module type. As with the other modules, there is also a VME interface 306 for communicating with the VME bus 132.

A Backplane FDDI Interface 310 is the interface which allows the TRA module 160 to communicate with the three Backplane FDDI rings 136, while two Physical FDDI Interfaces 330, 332 provide interfaces to the counter rotating rings of the FDDI network 62. One ring enters the in-primary port 334 of the "A" Physical FDDI Interface 330 and exits the out-primary port 336 of the "B" Physical FDDI Interface 332. Conversely, the counter rotating ring enters the in-secondary port 342 of the "B" Physical FDDI Interface 332 and exits the out-secondary port 340 of the "A" Physical FDDI Interface 330. FDDI Ring Multiplexing Logic 350 multiplexes the two rings of the FDDI network 62 to the three Backplane FDDI rings 136. Two Physical Connection Management (PCM) Support modules 352 assist in maintaining the physical connections for the "A" Physical FDDI Interface 330 and "B" Physical FDDI Interface 332. Two MAC buffers 360 and two FDDI MAC controllers 362, 364 buffer data being transmitted to and received from the rings of the FDDI network 62. In the embodiment shown, each MAC buffer 360 is a 32K by 32 bit memory. Together, the "A" Physical FDDI Interface 330, the "B" Physical FDDI Interface 332, the two PCM Support modules 352, the FDDI Ring Multiplexing Logic 350, the FDDI MACs 362, 364 and the two MAC buffers 360 form the FDDI network interface 370.

Figure 8:
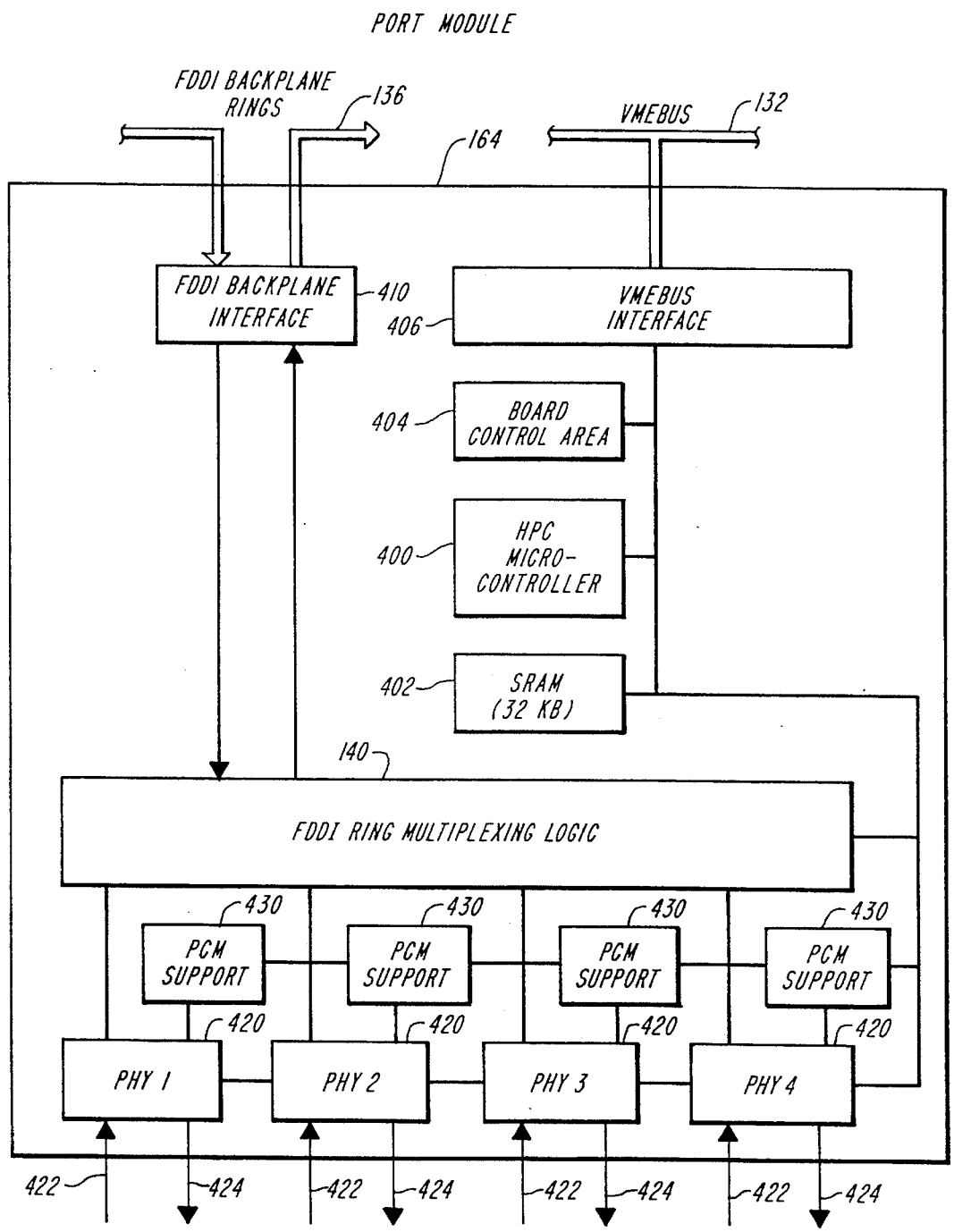
FIG. 8 is a block diagram of the FDDI Ports module shown in FIG. 4.

Referring to FIG. 8, the FDDI Port module 164 includes a microprocessor 400, 32 KB of static RAM memory 402, and an FDDI Port Module Control Area 404 which includes registers for storing module specific information, such as module revision and module type. As with the other modules, there is a VME interface 406 for communicating with the VME bus 132 and a Backplane FDDI interface 410 for communicating with the Backplane FDDI Rings 136. A node (not shown) communicates with the FDDI Port module 164 through one of a series of Physical Interfaces 420. Each Physical Port 420 includes an input optical interface 422 and an output optical interface 424. In the embodiment shown, each FDDI Port module 164 includes four Physical Interfaces 420, resulting in a total maximum of forty two Physical Interfaces 420 per system 128. Four PCM Support modules 430 attached to the Physical Interfaces 420 assist in maintaining physical connections for the interfaces. Data passes to FDDI Ring Multiplexing Logic 440, which determines to which Backplane FDDI Ring 136, the data is to be passed.

Operation

System Initialization:

Upon boot, the 68030 microprocessor executes boot code in the EPROM which causes the 68030 microprocessor to copy the system program from the Flash Prom into the DRAM. The 68030 microprocessor then executes the code in the DRAM and examines the addresses on the VME bus to determine which modules are present on the bus. Upon finding a module, the 68030 processor runs diagnostics on that module. If the diagnostics complete without error, the 68030 microprocessor then downline loads the operational software.

EI Module Operation:

The system 128 acts both as an FDDI concentrator which concentrates data packets from FDDI devices attached to its FDDI Port modules 420 and as an Ethernet multiplexer which multiplexes data packets from the Ethernet nodes attached to its EI 154. The EI 154 performs the necessary medium access control protocol conversion and places the packets on the FDDI network 136.

The operation of the EI module 154 can be understood in terms of these main functions performed by it: learning, filtering and address purging. Considering each function individually, when performing the learning function the EI module 154 builds a node address table only of the nodes on the attached Ethernet networks. To build this table, the Ethernet MACs are set to promiscuous mode which permits them to examine all Ethernet packets, regardless of the Ethernet address. When a packet arrives from an Ethernet network, the source address of the packet is examined and if the source address does not already exist in the address table, an entry is made in the table. In this manner, the EI module 154 learns the address of the nodes on each Ethernet attached to the EI module 154. This is contrasted to a bridge which learns the address on all of its attached networks.

Figure 9:
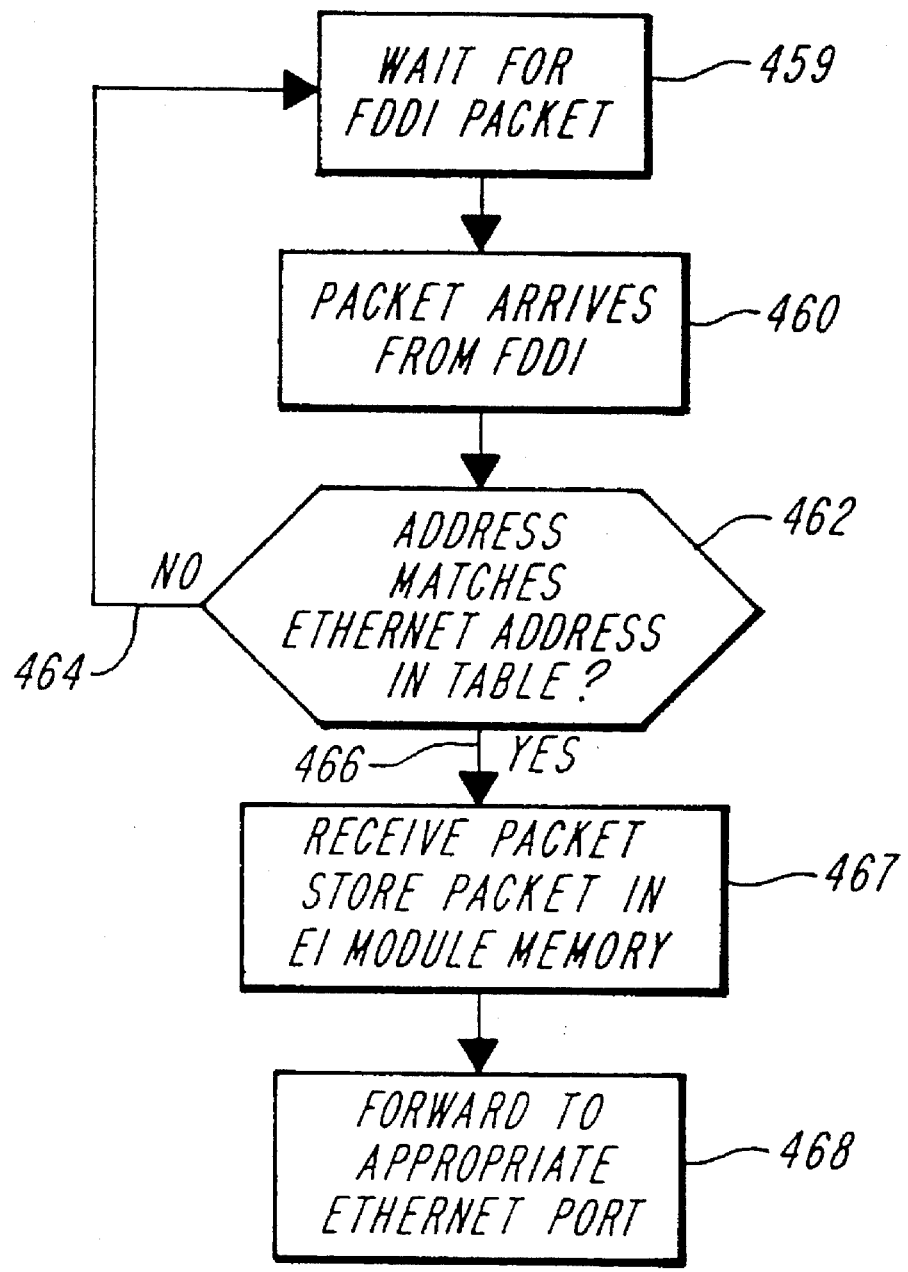
FIG. 9 is a flow diagram of an embodiment of a method utilized in the embodiment of the bridge depicted in FIG. 4.

Referring to FIG. 9, the filtering function, termed positive filtering, makes use of this address table to pass data packets from the FDDI network to the appropriate Ethernet network based upon the matching of the destination address of the data packet with the Ethernet addresses in the address table. Once a match is made between the data packet destination address and one of the addresses in the address table, the data packet is passed to the Ethernet port to which is connected the node with the destination Ethernet address.

Specifically, a data packet arrives (460) from the FDDI network 62 and the address in the packet header 42 is compared (462) for a match with Ethernet addresses in the address table. If no match exists 464, the packet is ignored. If a match exists 466, the packet is received and then forwarded (468) to the appropriate Ethernet port. This is contrasted with a bridge in which the destination address of the arriving packet is compared against a table of addresses for the network from which the packet arrived. The packet is only received if the address does not match.

Since the address table is of finite length, the third function, address purging, serves to delete from the network table those node entries which are least recently used, so as to generate room for new node entries. In the present embodiment, the address table of each EI module 154 has room for 256 entries and the least recently-used entries are deleted from the table once the table is full, as each new node entry arrives. This is contrasted with a bridge in which entries are purged from the address table on a periodic basis regardless of how full the address table is.

It is understood that other modifications or embodiments are possible which will still be within the scope of the appended claims. These and other examples of the concept of the invention illustrated above are intended by way of example and the actual scope of the invention is to be determined solely from the following claims.

We claim:

1. An apparatus for passing a data packet, having a destination address, between an FDDI network and a plurality of Ethernet networks, said apparatus comprising:

a VME bus;

a backplane FDDI ring;

a processor module in communication with said VME bus;

a trunk attach module in communication with said VME bus, and between said backplane FDDI ring and said FDDI network; and at least one Ethernet module in communication with said VME bus, said backplane FDDI ring and said plurality of Ethernet networks;

said processor module controlling said trunk attach module and said at least one Ethernet module by way of signals transmitted over said VME bus, said data packet passing between said trunk attach module and said at least one Ethernet module by way of said backplane FDDI ring, and said at least one Ethernet module passing said data packet from a first one of said plurality of Ethernet networks to said trunk attach module if said destination address does not correspond to an node address of a node on a second one of said plurality of Ethernet networks and passing said data packet to said second one of said plurality of Ethernet networks from said trunk attach module only if said packet destination address is a node address of a node on said second one of said plurality of Ethernet networks.

2. The apparatus of claim 1 further comprising at least one port module in communication with said VME bus, and said backplane FDDI ring, and at least one FDDI device.

3. The apparatus of claim 2 wherein said port module passes data between said FDDI network and said at least one FDDI device.

4. The apparatus of claim 2 wherein said port module passes data between said at least one Ethernet network and said at least one FDDI device.

5. A method of improving the performance available to a server in a star-wired configuration as a first local area network, said first local area network having a first predetermined maximum bandwidth, said plurality of nodes sharing said first predetermined maximum bandwidth of said first local area network and employing a first medium access control protocol comprising the steps of:

disconnecting a plurality of selected nodes from said server in said star-wired configuration;

reconnecting said disconnected plurality of selected nodes to a network interface having a plurality of first network interface ports, as a plurality of second local area networks, each of said plurality of second local area networks being connected to a respective one of said plurality of first network interface ports and each of said first network interface ports providing said first predetermined maximum bandwidth of said first local area network to at least some of said second local area networks connected to said respective ones of said plurality of first network interface ports, each of said second local area networks employing said first medium access control protocol;

connecting a third local area network having a bandwidth greater than each of said plurality of second local area networks to said network interface through a second network interface port, said third local area network having at least one node;

maintaining a unique node address of said at least one node of said plurality of second local area networks connected to said respective first network interface ports in a table of node addresses;

receiving in said network interface a data packet being transmitted from one of said third local area network and one of said plurality of second local area networks;

comparing the destination address of said data packet with the node addresses within said table of node addresses;

passing data within said data packet from said network interface received from said third local area network to one of said plurality of second local area networks only if said destination address of said data packet matches one of said node addresses within said table of node addresses;

passing data within said data packet from said network interface received from one of said plurality of second local area networks to said third local area network only if said destination address of said data packet does not match said node addresses in said table of node addresses; and passing data within said data packet from said network interface received from another of said plurality of second local area networks to one of said plurality of second local area networks only if said destination address of said data packet matches said node addresses in said table of node addresses.

* * * * *

UNITED STATES PATENT AND TRADEMARK OFFICE
CERTIFICATE OF CORRECTION

PATENT NO. : 5,471,472
DATED : November 28, 1995
INVENTOR(S) : R. Bruce McClure et al.

It is certified that error appears in the above-indentified patent and that said Letters Patent is hereby corrected as shown below:

Column 5, line 24, "FIGS. 4A and 4B," should read --FIGS. 4, 4A and 4B,--.

Signed and Sealed this

Second Day of July, 1996

Attest:

Attesting Officer

BRUCE LEHMAN

Commissioner of Patents and Trademarks